LUCIEN CHARLES HIPPOLYTE Juy
INVENTOR.

Nov. 2, 1954     L. C. H. JUY     2,693,116
CHANGE SPEED GEAR FOR BICYCLES AND THE LIKE VEHICLES
Filed Sept. 15, 1950     2 Sheets-Sheet 2
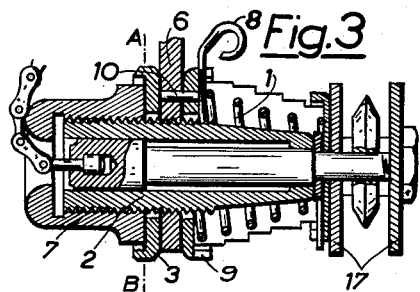
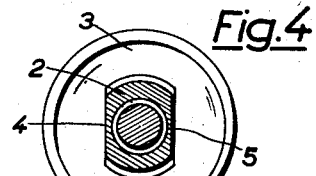
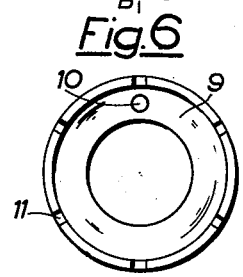
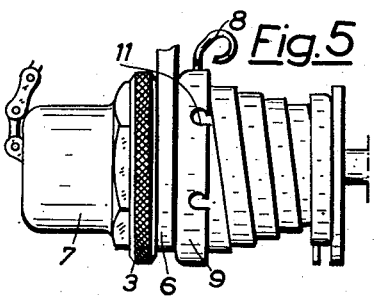
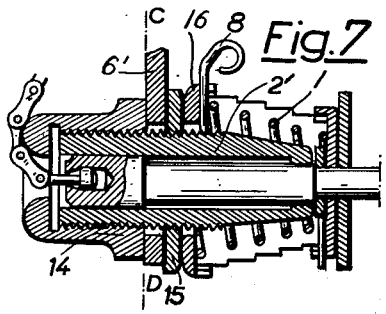
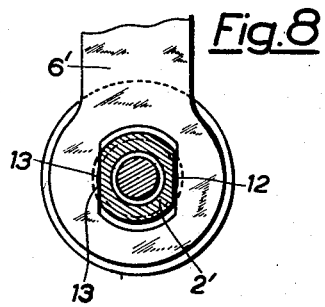
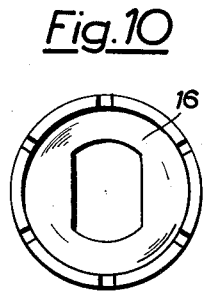
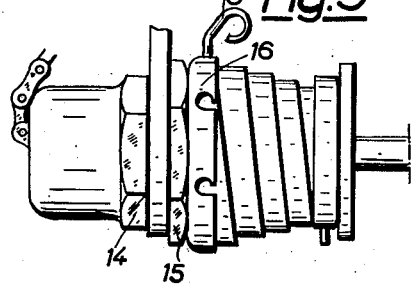
Lucien Charles Hippolyte Juy
INVENTOR.
BY J. Delattre-Joyeux
Attorney.

United States Patent Office 2,693,116
Patented Nov. 2, 1954

2,693,116

CHANGE SPEED GEAR FOR BICYCLES AND THE LIKE VEHICLES

Lucien Charles Hippolyte Juy, Dijon, France

Application September 15, 1950, Serial No. 185,035

Claims priority, application France November 22, 1949

4 Claims. (Cl. 74—217)

My invention has for its object improvements in change speed gears for bicycles and the like vehicles, and relates more particularly to transversely shiftable chain tensioning mechanisms and their control means.

According to my invention, the lateral adjustment of the outwardly threaded ring screwed into the mechanism-carrying system is provided through the agency of a member the rotation of which urges the ring to move in the direction of its axis, said member being constituted preferably by a washer having peripheral notches or projections engaging the outside of the ring in order that its rotation may ensure the rotation of the ring with reference to the mechanism-carrying system.

I have illustrated by way of example in accompanying drawings a preferred embodiment of my invention. In said drawings:

Fig. 3 is a general axial cross-sectional view of the portion of the change speed gear including my improved adjusting means.

Fig. 4 is a cross-section through line A—B of Fig. 3.

Fig. 5 is an outer general view of the arrangement illustrated in Fig. 3.

Fig. 6 is a side view of an adjusting member provided with notches for the selective engagement of the end of the control spring.

Fig. 7 is a general sectional axial view of a modification of the arrangement illustrated in Fig. 3.

Fig. 8 is a cross-section through line C—D of Fig. 7.

Fig. 9 is an outer general view of the arrangement illustrated in Fig. 7.

Fig. 10 is a side view of the adjusting member forming part of said modification and provided with notches as in the case of Fig. 6.

Figure 1:
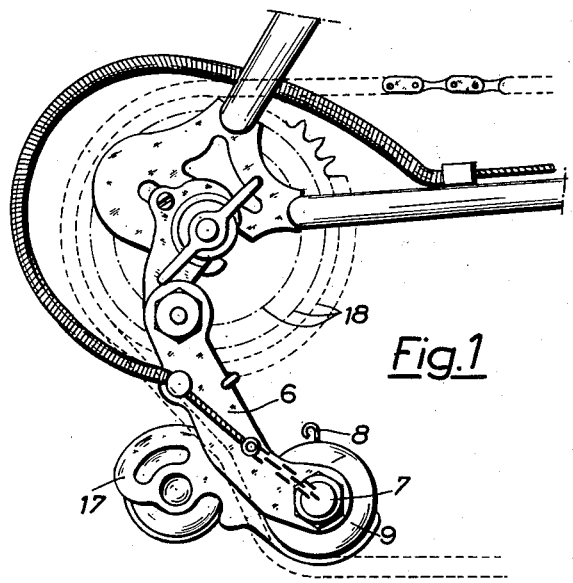
Fig. 1 is a side view of the change speed gear fitted on a bicycle and incorporating the improvements according to my present invention.
Figure 2:
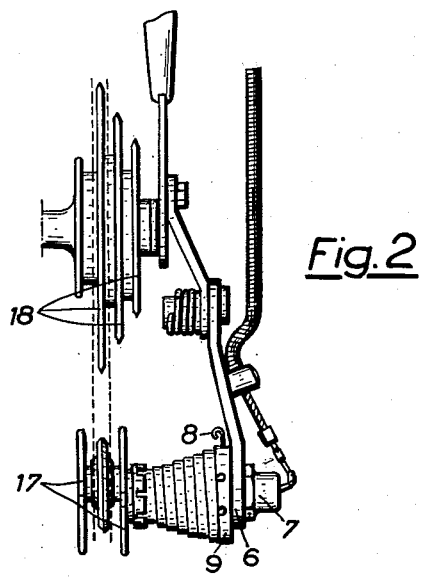
Fig. 2 is a rear view of the change speed gear illustrated in Fig. 1.

The standard change speed gear illustrated includes a tensioning arm adapted to shift transversely the chain tensioning means 17 and to make it register selectively with one of the chain engaging pinions 18; it includes a spring 1 adapted to operate against compression and torsion. The lateral alignment of the arm of the chain tensioning means 17 illustrated in Fig. 1 with reference to the different pinions 18 carried by the bicycle is obtained through the thrust provided by an axial shifting of the ring or sleeve 2 with reference to the carrier member 6. This shifting is performed through adjustment of the position of a washer 3 shown singly in Fig. 1, which washer is adapted to provide for the rotation of the ring 2 and consequently for the free shifting thereof through engagement of its threaded periphery with the tapped bore in the stationary carrier member 6.

In the embodiment illustrated in Fig. 3, the washer 3 is provided with a suitably shaped bore including two flat surfaces slidably engaging corresponding flats 4 and 5 on the ring 2. Obviously any other suitable guiding outline may be used for the interengaging surfaces of the members 2 and 3.

It is apparent that any angular movement of the washer 3 provides for a rotation of the ring 2. The latter screwed into the stationary carrier member 6 of the change speed gear assumes a translational movement along its axis. The locking of the whole arrangement is provided through a mere screwing home of the outer nut 7 as soon as the desired axial adjustment has been obtained for the ring 2.

The nut 7 provides for this locking of the system by urging the washer 3 against the carrier member 6. The angular tension of the spring 1 acting on the chain tensioning means 17 may be adjusted on the other hand by engaging the outer end 8 of said spring 1 selectively in one of the notches 11 of a cup-shaped member 9 rigid with the carrier member 6 (Fig. 5). Said cup-shaped member 9 does not rotate together with the ring 2 during the adjustment thereof and its bore is sufficiently large for the ring 2 to pass through said cup-shaped member freely.

The cup-shaped member 9 is secured to the carrier member 6 so as to be angularly rigid therewith through any known or suitable means such as a pin, a rivet, a screw, welding, fitting or the like. In the example illustrated in Fig. 3, a rivet 10 is resorted to for connecting the two members 6 and 9. Obviously the cup-shaped member 9 may form a unitary structure with the carrier member 6 and, according to the material forming the latter, the members 6 and 9 may be obtained as a unit through casting, stamping or the like procedure.

It should be remarked that, in Fig. 3, both adjusting members for the ring 2, as shown at 3 and 7, are within reach of the rider's hand and this adjustment is performed without the end 8 of the spring forming a hindrance since said end is held fast inside a notch 11. Consequently the adjustment of the axial position of the ring 2 may be obtained without any modification in the adjustment of the angular tensioning of the spring 1. The expanding spring 1 bears against the cup-shaped member 9 in contact with the carrier member 6.

In the modification illustrated in Figs. 7 to 10, the carrier member 6¹ (Fig. 7) is no longer tapped and the bore therein is provided with two flat surfaces 12—13 to allow the ring 2¹ assuming a corresponding outline to slide axially through said carrier member 6¹ without any angular shifting with reference thereto. The translational shifting of the system with a view to adjusting the location of the tensioning arm is obtained through a corresponding screwing or unscrewing of the nuts 14 and 15. The cup-shaped member 16 is provided along its bore with two flats corresponding to the flats at the periphery of the ring 2¹ (Fig. 10) so that the end 8 of the spring may be reliably held in the desired angular position without any risk of an undesired shifting.

The expanding spring 1 urges the cup-shaped member 16 into contact with the nut 15 inserted between the members 6¹ and 16. As disclosed, the transverse adjustment is provided through the nuts 14 and 15 of Fig. 9 without this leading to any angular shifting of the cup-shaped member 16 or of the end 8 of the spring engaging the latter.

What I claim is:

1. In a change speed gear for bicycles and the like vehicles including a transversely shiftable chain tensioning member and control means therefor, the combination of a stationary carrier member, an outwardly threaded sleeve passing through said carrier member and one end of which engages the chain tensioning member, at least one control member threadedly engaging the thread on the sleeve and the rotation of which produces a movement of the sleeve in the direction of the axis with reference to the carrier member, a cup-shaped member angularly rigid with the carrier member and provided with a plurality of peripheral notches, a coil spring surrounding the sleeve coaxially and one end of which selectively engages one of the notches on the cup-shaped member and the other end is rigid with the chain tensioning member.

2. In a change speed gear for bicycles and the like vehicles including a transversely shiftable chain tensioning member and control means therefor, the combination of a stationary carrier member, an outwardly threaded sleeve passing through said carrier member and one end of which engages the chain tensioning member, said sleeve threadedly engaging said carrier member, a washer fitted over said sleeve and adapted when rotated to provide for rotation of said sleeve with reference to the carrier member and consequently for an axial movement of said sleeve with reference to the latter, a cup-shaped member angularly rigid with the carrier member and provided with a plurality of peripheral notches, a coil spring surrounding the sleeve coaxially and one end of which selectively engages one of the notches on the cup-shaped member and the other end is rigid with the chain tensioning member.

3. In a change speed gear for bicycles and the like vehicles including a transversely shiftable chain tensioning member and control means therefor, the combination of a stationary carrier member, an outwardly threaded sleeve having two outer flat longitudinal sections passing through said carrier member and one end of which engages the chain tensioning member, said sleeve threadedly engaging said carrier member, a washer fitted over said sleeve including flat parts engaging the flat sections of the latter and adapted when rotated to provide for rotation of said sleeve with reference to the carrier member and consequently for an axial movement of said sleeve with reference to the latter, a cup-shaped member angularly rigid with the carrier member and provided with a plurality of peripheral notches, a coil spring surrounding the sleeve coaxially and one end of which selectively engages one of the notches of the cup-shaped member and the other end is rigid with the chain tensioning member, and a nut threadedly engaging the thread on the sleeve on the side of the washer opposed to the carrier member and adapted upon rotation to urge said washer against said carrier member.

4. In a change speed gear for bicycles and the like vehicles including a transversely shiftable chain tensioning member and control means therefor, the combination of a stationary carrier member provided with an opening having two flat sides, an outwardly threaded sleeve passing through the opening in said carrier member and having two flat sides mating the flat sides of the opening, the end of said sleeve engaging the chain tensioning member, two nuts engaging the thread on the sleeve to either side of the carrier member and the rotation of which provides in cooperation for the adjustment of the axial location of the sleeve with reference to the carrier member, a cup-shaped member angularly rigid with the carrier member and provided with a plurality of peripheral notches, a coil spring surrounding the sleeve coaxially and one end of which engages selectively one of the notches on the cup-shaped member and the other end is rigid with the chain tensioning member.

References Cited in the file of this patent

UNITED STATES PATENTS

| Number | Name | Date |
| --- | --- | --- |
| 863,422 | Newton | Aug. 13, 1907 |
| 882,845 | Sachs | Mar. 24, 1908 |
| 931,656 | Sangster | Aug. 17, 1909 |
| 2,428,166 | Letourneaur | Sept. 30, 1947 |
| 2,431,513 | Schwinn | Nov. 25, 1947 |

FOREIGN PATENTS

| Number | Country | Date |
| --- | --- | --- |
| 464,135 | Great Britain | Apr. 12, 1937 |
| 256,159 | Switzerland | Feb. 16, 1949 |
| 309,519 | Italy | July 8, 1933 |